United States Patent
Sleppy et al.

(10) Patent No.: US 6,415,913 B2
(45) Date of Patent: *Jul. 9, 2002

(54) EXCITED BASE CONVEYOR SYSTEM

(75) Inventors: Paul I. Sleppy, Penn Run; Harold E. Patterson, Indiana, both of PA (US)

(73) Assignee: FMC Technologies, Inc., Chicago, IL (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/819,234

(22) Filed: Mar. 17, 1997

(51) Int. Cl.[7] ............................................. B65G 27/16
(52) U.S. Cl. .................. 198/766; 198/752.1; 414/525.7
(58) Field of Search .................... 29/592, 428; 198/770, 198/750.1, 750.8, 752.1, 759, 763, 764, 766; 414/525.7, 525.8, 800

(56) References Cited

U.S. PATENT DOCUMENTS

| 2,705,070 A | | 3/1955 | Carrier, Jr. et al. |
| 3,216,556 A | | 11/1965 | Burgess |
| 3,287,983 A | * | 11/1966 | Austin et al. ......... 198/766 XV |
| 3,901,380 A | * | 8/1975 | Zier et al. .................... 198/766 |
| 4,088,223 A | * | 5/1978 | Bertrand ............... 198/766 XV |
| 4,260,052 A | | 4/1981 | Brown ........................ 198/763 |
| 4,313,535 A | | 2/1982 | Carmichael |
| 4,315,817 A | * | 2/1982 | Popper ................. 198/766 XV |
| 4,356,911 A | | 11/1982 | Brown ........................ 198/766 |

FOREIGN PATENT DOCUMENTS

| AU | 228698 | * | 7/1963 | ................. 198/766 |
| DE | 10-29-288 B | | 4/1958 | |
| DE | 1290869 | * | 3/1969 | ................. 198/766 |
| FR | 1.047.470 | | 1/1952 | |
| FR | 1084043 | * | 1/1955 | ................. 198/766 |

OTHER PUBLICATIONS

FMC Corporation, *Syntron BF–4 Scale Feeder*, Not Dated, 2 pages, Homer City, PA.
FMC Corporation, *Syntron Light–Capacity Electronic Vibrating Feeders*, 1994, 20 pages, U.S.A.

* cited by examiner

Primary Examiner—Frank E. Werner
(74) Attorney, Agent, or Firm—Rockey, Milnamow & Katz, Ltd.

(57) ABSTRACT

A base excited vibratory trough conveyor includes a trough mounted on leaf springs to a base which is excited by a linear vibratory drive. The vibratory drive produces a linear force which is oriented to be perpendicular to the springs, and the linear force is adjusted to equal the reaction force of the springs on the base during the desired stroke. Such balancing results in no stroke or movement of the base. A more lightweight base can thus be used without requiring that the base center of gravity be aligned along the center of gravity of the conveyor and the trough, or that the base be excessively heavy.

5 Claims, 3 Drawing Sheets

EXCITED BASE CONVEYOR SYSTEM

FIELD OF THE INVENTION

The present invention relates to vibratory conveyors, and particularly to excited base vibratory conveyors which include a trough which is spring mounted to a base wherein the base is excited by a vibration driver, and the trough is vibrated through the spring mounting. Particularly, the invention relates to the balancing and orienting of the forces produced by a linear vibratory driver which act directly on a base, with respect to a center of gravity of a trough which is supported by springs from the base, and with respect to the spring forces which support the trough from the base, to minimize movement of the base, while minimizing the required weight of the base.

BACKGROUND OF THE INVENTION

Vibratory conveyors are often used by industry to transport bulk materials or small parts, and perform processing operations such as screening, transferring, singulating, heating, cooling, etc., on bulk materials such as food products, chemicals, sand, gravel, foundry parts, and other similar applications. Typical food products conveyed include snack foods such as potato chips, pretzels, nachos, corn puffs, etc., vegetables, cereals and the like.

Vibratory conveyors offer many advantages over alternate conveying means in applications where, for example, sanitary considerations, precise or controlled feed rates, particular process operations, or low maintenance, are important to the end user. Although vibratory conveyor systems can incur a higher initial cost than some available alternate conveying means, vibratory conveyor systems offer advantages which offset the higher cost for many applications. For some applications practical alternative conveying means are not available. It would be advantageous, however, to reduce the cost of vibratory conveyors by reducing manufacturing cost while maintaining effective operation of the conveyor.

There are many design variations of vibratory conveyors, including both single mass and two-mass designs. Variations of the two-mass designs, such as base excited vibratory conveyors, include: crank-driven balanced isolated base designs, such as FMC Corporation's MHE Operation's BL and LBL conveyors; and crank-driven counter-balanced base designs.

Certain prior art two-mass conveyor designs are configured such that the directed force exciting the conveyor falls on a line aligning the center of gravities of both the trough and base members of the conveyor, and perpendicular to a face of the drive springs. This design is disclosed in U.S. Pat. No. 4,313,535 for example. This patent discloses an excited base conveyor having a linear forcing function drive means which generates a force drive line that is colinear with a line passing substantially through the center of gravity of the trough mass, conveyor system mass, and the base mass.

As a result of this design approach, it is often necessary, particularly with short conveyors, to add large amounts of weight to the base member such that the plural center of gravities may be brought into alignment. In crank-driven or magnetically excited conveyor designs, the drive force is applied simultaneously to both the base and trough members, and the relationship of the stroke on the base to the design trough stroke is inversely proportional to the weight ratio between the base and the trough. In order to minimize the forces transmitted to the support structure for the conveyor, it is required that the stroke on the base must be kept as small as practical, and so the base structure tends to become quite heavy. Ratios of base to trough weights in these prior designs typically range from 3:1 to 8:1 and more.

In the case of the base excited conveyor, however, the stroke on the base is more dependent on the tuning of the conveyor, and the relationship of the natural frequency of the mass/spring system to the operating frequency of the conveyor. The resultant base weight to trough weight ratio can be in a range of 1.5:1 to 3:1 or more depending on the available force, and thus how close to resonance it is necessary to tune the conveyor to get the desired trough stroke.

Although the excited base conveyor design has an advantage over the crank-driven conveyor from a weight-of-base perspective, it is still possible that a relatively heavy base structure is required for the excited base design. It would be advantageous to provide a design whereby the overall weight of the conveyor, and particularly the weight of the base is minimized.

SUMMARY OF THE INVENTION

The vibratory conveying device embodying the present invention includes a trough for transporting materials, a base underlying the trough, the trough supported from the base by a plurality of elongate leaf springs. A linear vibratory drive is connected to the base. The linear vibratory drive generates a linear force along a first line which passes through a center of gravity of the trough. The springs are arranged parallel to a second line which defines a spring angle, with the first line being perpendicular to the second line. The force generated by the linear vibratory driver is equal to and opposite to the reaction force of the plurality of springs. The center of gravity of the base is located at a distance from the first line, i.e., the center of gravity of the base need not be located along the line of linear force which includes the center of gravity of the trough.

According to the invention, for a base excited conveyor design, the dynamic motion of the conveyor can be balanced without having to align the center of gravities of the trough and base to be colinear with the drive line. It is only necessary to balance the spring force of the two-mass system with the force generated by the linear drive, such that the stroke on the base member is virtually zero. Since the base has zero motion, the spring system can be somewhat evenly balanced about the center of gravity of the trough, and no unbalanced moments exist that cause a rotation, or a pitching of the base. Without motion of the base, the support structure has virtually only the static load of the conveyor resting thereon.

By balancing the forces acting on the base, the design of the base is dictated by required structural integrity considerations, and not weight for balancing the stroke of the trough. The base must be strong enough to withstand the imposed loads and have sufficient stiffness to avoid any natural bending frequency of the base structure that would be susceptible to excitation by the operating frequency of the conveyor. Thus, the weight of the base can be made lighter than prior art excited base designs. The base being lighter, the overall weight of the conveyor can be made lighter, representing a lower installation cost for the user and reduced size and complexity of the support structure for the conveyor.

Other features and advantages of the present invention will become readily apparent from the following detailed description of the accompanying drawings, and the appended claims.

DETAILED DESCRIPTION OF THE PREFERRED EMBODIMENTS

Figure 1:
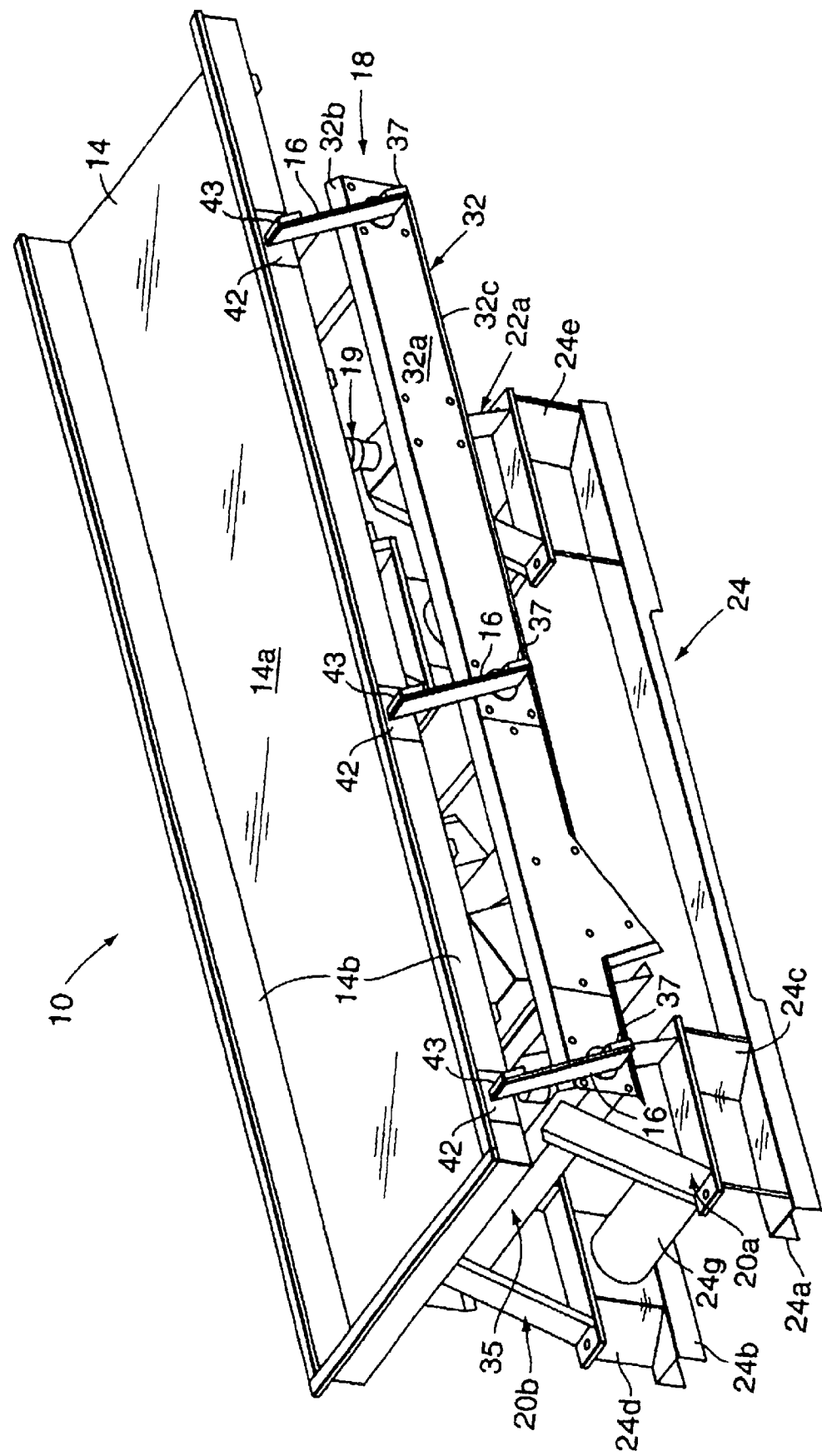
FIG. 1 is a perspective view of a base excited conveyor of the present invention.

While the present invention is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

Figure 2:
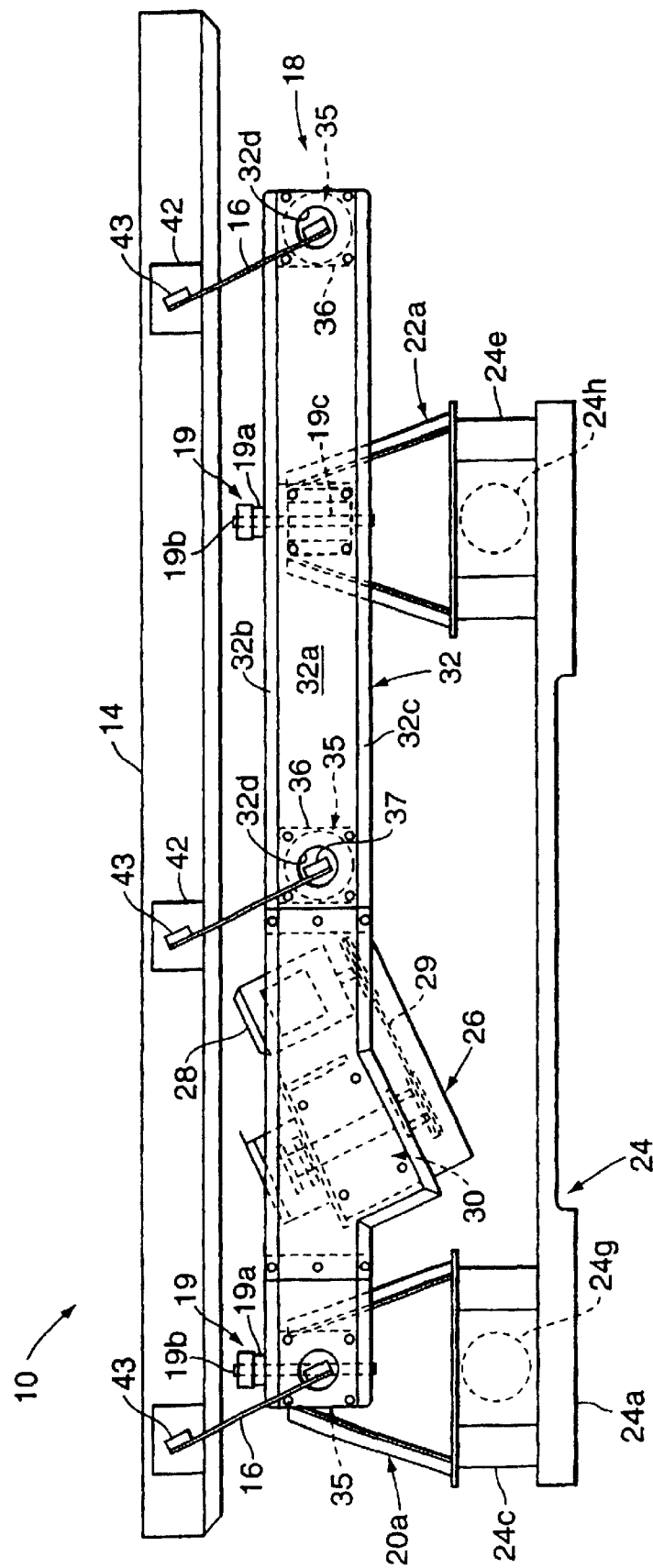
FIG. 2 is an elevational view of the base excited conveyor shown in FIG. 1.
Figure 3:
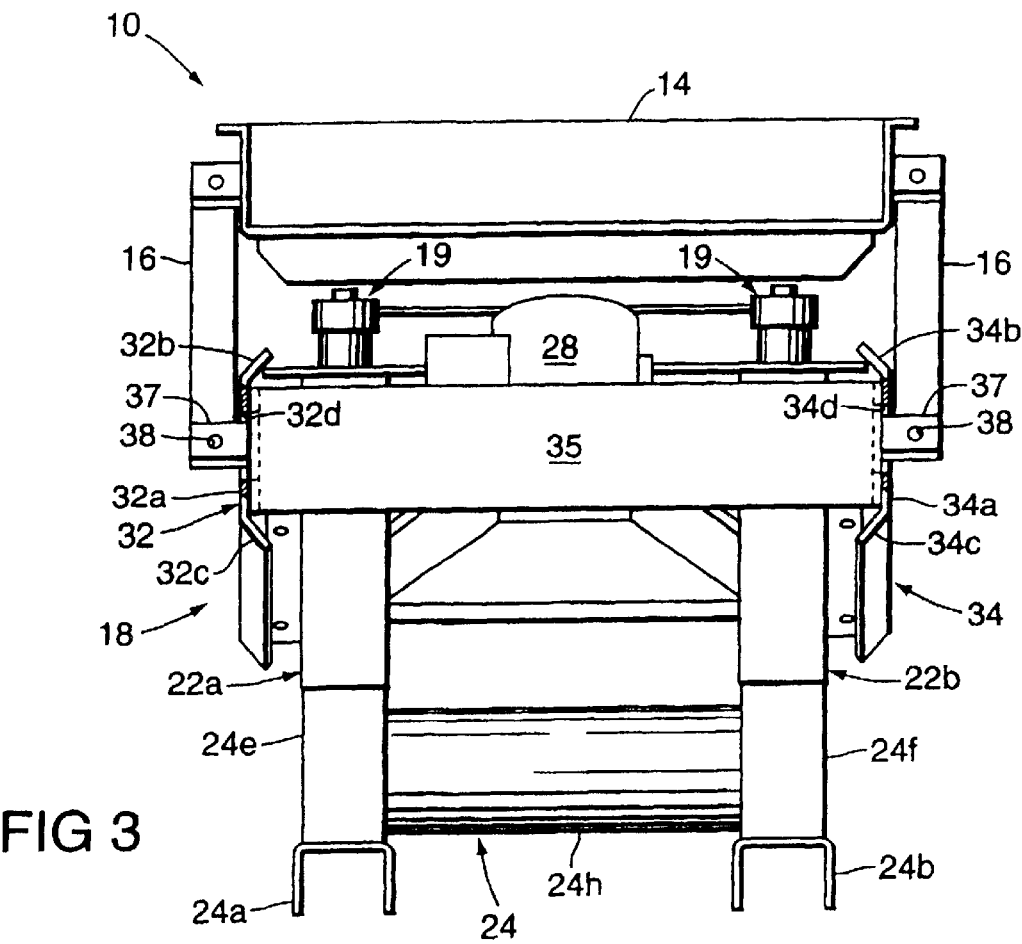
FIG. 3 is a right side view of the conveyor shown in FIG. 1.

FIGS. 1 through 3 illustrate a trough conveyor 10 which incorporates the present invention. The trough conveyor 10 includes a trough 14 mounted via a plurality of springs 16 to a base 18 which is supported via vibration "cushions" or "isolators" 19 from A-frames 20a, 20b; 22a, 22b which are supported on a mounting frame 24. The mounting frame 24 includes skids 24a, 24b, pedestals 24c, 24d, 24e, 24f, supported on the skids 24a, 24b, and lateral tubular braces 24g, 24h connecting the pedestals in pairs. The isolators 19 can include elastomeric rings or blocks, or pneumatic or hydraulic dampers in combination with spring members, which support from below a flange 19a connected to a threaded rod 19b, the rod hanging the base 18 from above. The base 18 then, in effect, resiliently floats on the A-frames 20a, 20b; 22a, 22b without imparting significant vibration thereto.

Supported by the base is a vibratory drive 26 including a motor 28 driving a belt 29 which drives a linear vibratory exciter 30 which utilizes the counter rotation of eccentric weights held on counter rotating shafts (not shown) to create a linear vibration along a line, as described below. Preferably two or four eccentric weights are used.

The vibratory drive 26 is mounted to the base 18 to vibrate the base, which in turn, transmits force through the plurality of springs 16 which operatively connect the base 18 with the conveyor trough 14. In this manner, vibratory drive of the base 18 imparts material-conveying vibratory motion to the conveyor trough 14 via the springs 16. The springs 16 may each comprise one or more leaf springs. Multiple leaf springs can be arranged in stacked fashion to increase the stiffness of the spring.

The base 18 of the conveyor 10 includes a pair of laterally spaced, longitudinally extending base members 32, 34e each preferably having a generally inwardly open, channel-like configuration. As such, each of the base members 32, 34 includes a vertically oriented web portion 32a, 34a respectively, and upper and lower flanges 32b, 32c; 34b, 34c respectively extending from the web portions. The base 18 further includes a plurality of longitudinally spaced, transversely extending spring-mount cross-member assemblies 35 which extend between and are connected to the pair of laterally spaced base members 32, 34. The overall construction of the base 18 is of a generally lightweight configuration, thereby promoting operating efficiency of the conveyor structure.

Each cross-member 35 is closed at opposite ends by end plates 36 which bolt to the vertical web portions 32a, 34a of the base members 32, 34. The vertical webs 32a, 34a include side holes 32d, 34d in alignment with the end closing plates 36.

Extending outwardly from each closing plate 36 at the end of each cross-member are lugs 37, each having a fastener receiving aperture 38 therethrough. The lugs 37 extend through the side holes 32b, 34b. The lugs tilt rearwardly (leftwardly in FIG. 2). A leaf spring 16 is connected by a bolt and cooperating nut (not shown) to each lug 37 at the aperture 38, and extends from each lug 37 up to the trough 14 to be connected thereto.

Each of the cross-member assemblies 35 (three being shown in the illustrated embodiment) extends between the laterally spaced base members 32, 34, with the end plates 36 of each cross-member assembly 35 respectively connected to the inwardly facing surface of the web portion 32a, 34a of the respective one of the base members 32, 34. In order to minimize distortion of the various components of the base 18, it is presently preferred that the rectangular end plates 36 of each cross-member 35 be connected to the respective one of the base members 32, 34 by a plurality of mechanical fasteners and minimum welding, if necessary.

The springs 16 thus provide the desired operative connection of the base to the conveyor trough for transmission of vibratory forces from the driver 26 through the base 18 to the conveyor trough 14. Alternatively, a vibratory driver can be physically connected to the trough 14 to excite the trough directly while the trough is supported from the leaf spring supports as described above. It is also within the scope of the present invention that the vibratory device is not limited to the device shown and described but also encompasses all mechanical, electromagnetic or other type vibratory drivers.

Welded intermittently along the trough 14a are L-shaped trough brackets 42. The trough brackets are flushly arranged against and reinforce a floor panel 14a and a side panel 14b of the trough 14. The trough brackets each have a spring mounting block 43 located substantially centrally thereof and tilted to be angularly aligned with a corresponding one of the spring mounts 35 on the base 18. The respective leaf spring 16 is correspondingly connected by a bolt to the mounting block 43.

Figure 4:
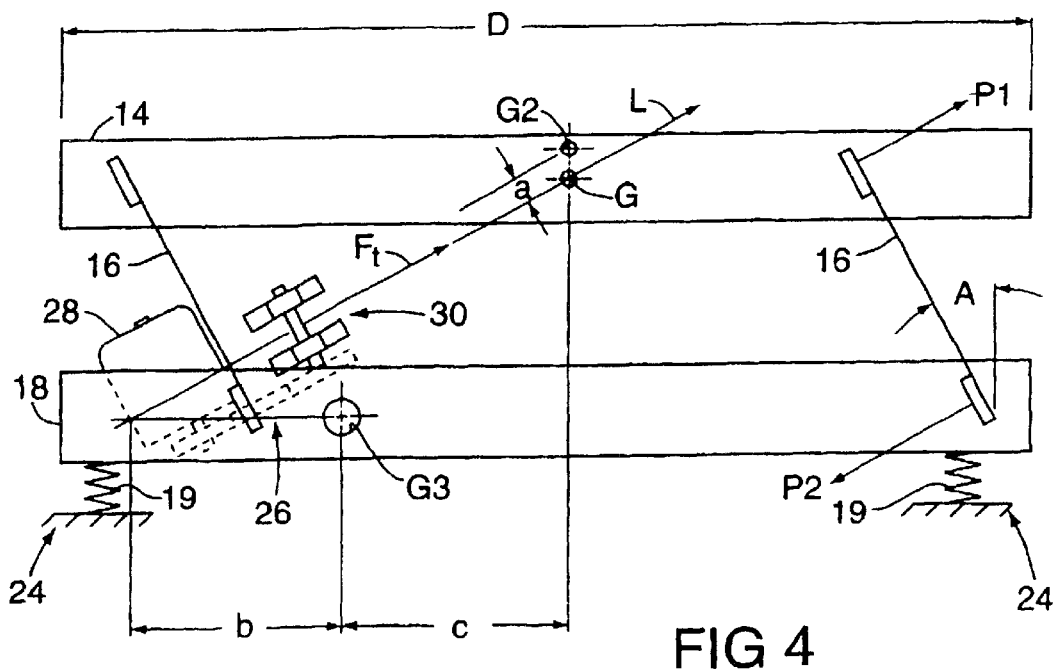
FIG. 4 is a diagram of the conveyor shown in FIG. 1.

FIG. 4 illustrates a schematic representation of the two-mass, isolated base excited conveyor 10. The trough member 14 is shown above the base member 18 of the conveyor. Conversely, the base member could be located above the trough, suspending the trough therefrom. The springs 16 elevate the trough member 14a above the base 18. The springs 16 are mounted at a mounting angle A between the trough 14a and the base 18. The vibration generator 26 is typically a linear excited drive, which includes four eccentric weights synchronized together with a geared belt and used to generate a linear force or "required force" $F_r$. A center of gravity G of the trough member 14 is shown. The force $F_t$ is arranged along a line L passing through the center of gravity G of the trough 14. The mounting frame 24 is shown schematically supporting the conveyor and connected to the base 18 by means of the isolators 19. Opposite and equal forces P1, P2, respectively, are applied by the spring system to the trough 14 and base 18, respectively.

According to the invention, for a base excited conveyor design, the dynamic motion of the conveyor can be balanced without having to align the center of gravities of the trough and base to be colinear with the drive line L. It is only necessary to balance the spring force P1, P2 of the two-mass system with the force $F_t$ generated by the linear exciter 30, such that the stroke on the base member 18 is virtually zero. The linear drive force $F_t$ is then applied along its drive line L perpendicular to the springs 16 such that it only passes through the center of gravity G of the trough member 14. Since the base 18 has zero motion (because the forces acting on the base 18 are balanced), if the spring system is somewhat evenly distributed about the center of gravity G of the trough 14, no unbalanced moments exist that could cause a rotation, or pitching of the base 18. Also, since the motion of the base 18 is virtually zero, the support structure has virtually only the static load of the conveyor resting thereon.

Since the forces acting on the base are balanced, and it is not necessary to align the center of gravities of the base 18 and the trough members 14, the only constraints on the design of the base 18 that impact its weight are those of structural integrity. The base 18 has to be strong enough to withstand the imposed loads, and have the right stiffness to avoid any natural bending frequency of the base structure that might be excited by the operating frequency of the conveyor. The weight of the base 18 for any given application can therefore be made much lighter than any of the prior art designs. Since the base is much lighter, the overall weight of the conveyor is lighter, and this represents a lower installation cost for the user, as the size and complexity of the support structure for the equipment can be reduced.

The invention is explained with the following analysis.

Assuming the forcing function to be sinusoidal, then the acceleration of the trough motion may be expressed by equation e1:

$$a_1 = \frac{A_t}{2}\omega^2 \sin\omega \quad \text{e1}$$

where
$a_1$=the trough acceleration
$A_t$=the trough stroke $\omega = 2\pi f$ the angular frequency $$= \frac{N2\pi}{60}$$

where N=the operating speed of the conveyor (rpm) and where $a_1$ is at a maximum value when $\sin \omega = 1$ and the force required to produce a desired maximum stroke $A_t$ is given by e2:

$$F_t = M_t a_1 \quad \text{e2}$$

where
$F_t$=the required force
$M_t$=mass of the trough
and by substituting e1 into e2 the equation becomes:

$$F_t = M_t \frac{A_t}{2}\omega^2 \quad \text{e3}$$
$$= \frac{W_t}{386}\frac{A_t}{2}\omega^2$$
$$= \frac{W_t}{386}\frac{A_t}{2}\left(\frac{N2\pi}{60}\right)^2$$

where
386=the acceleration due to gravity
$W_t$=the weight of the trough

This force $F_t$ is applied to the trough 14 through the spring system, the only means attached to the trough in the base excited conveyor design. The required spring rate $C_1$ of the spring system is derived from the trough force by converting it into lb./in., and may be expressed as:

$$C_1 = \frac{W_t N^2}{35200} \quad \text{e4}$$

Since the spring system is also attached to the base 18, equal and opposite reaction forces P1, P2 are applied to the base 18 by the spring system 16.

The forces generated by the rotating eccentric weights 30 in FIG. 4, of the linear exciter 26, may be computed as shown in equation $$F_w = M_w r \omega^2 \quad \text{e5}$$

where
$F_w$=force generated by the eccentric weights
$M_w$=mass of the weights
r=distance from center of rotation to the center of gravity of the eccentric weight For the linear drive 26 which has four weights, e5 may be rewritten as:

$$F_w = \frac{4W_w}{386} r\left(\frac{N2\pi}{60}\right)^2 \quad \text{e6}$$

where
$W_w$=the weight of an eccentric weight and e6 may be reduced to:

$$F_w = \frac{W_w r N^2}{8800} \quad \text{e7}$$

In order to have zero motion on the base 18, the drive 26 must be located so that the linear force $F_t$ it generates passes through the center of gravity G of the trough member 14 and perpendicular to the spring 16. Also, the forces generated, $F_t$ and $F_w$ must equal each other such that:

$$F_w = F_t \quad \text{e8}$$

and combining with equations e3 and e6:

$$\frac{4W_w}{386} r\left(\frac{N2\pi}{60}\right)^2 = \frac{W_t}{386}\frac{A_t}{2}\left(\frac{N2\pi}{60}\right)^2 \quad \text{e9}$$
$$= 4W_w r = W_t \frac{A_t}{2}$$
$$= 8W_w r = W_t A t$$

To practice the invention, the following steps are followed:

1. Determine the trough weight $W_t$, and its center of gravity G.
2. Select an operating frequency N, spring angle A, and trough stroke $A_t$ to yield the desired feed rate characteristics.
3. Calculate the required force $F_t$ and spring rate $C_1$.
4. Design the base member 18 to meet the requirements for structural integrity, and analyze to make sure that there is no unwanted natural frequency bending modes at the selected operating frequency N.
5. Locate the springs of the spring system at a proper location on the trough 14 and base 18, such that they are somewhat evenly distributed about the center of gravity G of the trough member 14, and mounted at the correct angle A.
6. Select the standard linear exciter drive 26, such that it is the correct size to generate the force required to satisfy equation e9. The linear exciter 26 may be so designed that the eccentric weights are adjustable to facilitate a precise implementation of balancing the forces $F_w$, $F_t$ per equation e9.

7. Determine the placement of and mount the linear exciter drive 26 to the base member 18 such that the line L of generated force $F_t$ is perpendicular to the springs and passes through the center of gravity G of the trough 14.

Unlike U.S. Pat. No. 4,313,535 and other similar prior art base excited conveyors, there is obviated the requirement to determine the weight or center of gravity of the base member. Since the alignment of the center of gravities of the base and trough members is not of concern, nor is having to adjust the weight of the base in order to practice the present invention, a more lightweight and cost effective apparatus can be manufactured.

By employing the above described inventive design criteria, the base weight can be reduced to operate satisfactorily at a base weight-to-trough weight ratio of 1.5 to 1, and below 1.5. A 1 to 1 base weight-to-trough weight ratio has been successfully employed. In calculating the center of gravities of the trough and the base, the weight of the springs is allocated evenly to each of the trough and base (50%-50%) and the trough is considered empty of material.

Although arranging the line of force L to pass through the trough center of gravity G is advantageous, satisfactory conveyor performance can still be achieved when the trough center of gravity deviates a limited amount from the line L. An alternate trough center of gravity G2 is shown located a distance a from the line of force L. Advantageously the dimension a should be less than or equal to 0.21 inches per foot of trough length. $a \leq 0.21(D)$. The driveline L may be on either side of the trough center of gravity G2.

Also, according to the invention, a distance b from a base center of gravity G3 to the line of force L can be greater than about 20% of a distance c between the base center of gravity G3 and the trough center of gravity G2, all measured longitudinally of the conveyor. That is, b>0.2c. The driveline L may be on either side of the base center of gravity G3.

From the foregoing, it will be observed that numerous modifications and variations can be effectuated without departing from the true spirit and scope of the novel concept of the present invention. It is to be understood that no limitation with respect to the specific embodiment as illustrated is intended or should be inferred. The disclosure is intended to cover by the appended claims all such modifications as fall within the scope of the claims.

The invention claimed is:

1. A base excited two-mass vibratory conveyor, comprising:

a frame;

a trough for transporting materials;

a base underlying said trough;

a plurality of resilient supports arranged to resiliently support said base from said frame;

a plurality of elongate leaf springs extending between said trough and said base and connected at opposite ends to said trough and said base, connecting said trough to said base;

a linear vibratory drive solely connected to said base and exciting vibration in said trough through said leaf springs, said vibratory drive mechanically isolated from said trough except for being indirectly connected to said trough via said base and said leaf springs;

wherein said linear vibratory drive is arranged to generate a linear force along a first line which passes through said trough within a tolerance distance of a center of gravity of said trough, and said tolerance distance is less than or equal to 0.21 inches per foot of trough length, and said springs are arranged parallel to a second line defining a spring angle, and said first line is perpendicular to the second line, and wherein the force generated by the linear vibratory driver is equal to and opposite to the reaction force of said plurality of springs; and wherein a center of gravity of the base is located at a distance from said first line;

in order to make a flow rate of conveyed material regular and constant.

2. The conveyor according to claim 1 wherein said base and said trough have a base weight-to-trough weight ratio of: W to 1, wherein W is less than 1.5.

3. The conveyor according to claim 2 wherein W is between 1.5 and 1.0.

4. The conveyor according to claim 1 wherein said base has a center of gravity and a first distance measured between said center of gravity of said base and said first line measured longitudinally along said base is at least 20% of a second distance measured between said center of gravity of said base to said center of gravity of said trough measured longitudinally along said base.

5. The conveyor according to claim 1, wherein said frame is located at least partially below said base and supports said base from below.

* * * * *